(12) United States Patent
Zheng et al.

(10) Patent No.: US 11,302,359 B2
(45) Date of Patent: Apr. 12, 2022

(54) HOLOGRAPHIC STORAGE DEVICE AND METHOD FOR SIMULTANEOUSLY RECORDING AND READING ON TWO SIDES

(71) Applicant: Amethystum Storage Technology Co., Ltd., Guangdong (CN)

(72) Inventors: Mu Zheng, Guangdong (CN); Tiewei Luo, Guangdong (CN); Jun Tian, Guangdong (CN); Dejiao Hu, Guangdong (CN); Yicheng Liu, Guangdong (CN)

(73) Assignee: Amethystum Storage Technology Co., Ltd., Guangdong (CN)

( * ) Notice: Subject to any disclaimer, the term of this patent is extended or adjusted under 35 U.S.C. 154(b) by 0 days.

(21) Appl. No.: 17/135,201

(22) Filed: Dec. 28, 2020

(65) Prior Publication Data

US 2021/0225399 A1 Jul. 22, 2021

(30) Foreign Application Priority Data

Dec. 31, 2019 (CN) .......................... 201911422752.6

(51) Int. Cl.
*G11B 7/00* (2006.01)
*G11B 7/0065* (2006.01)
*G11B 7/08* (2006.01)
*G11B 7/128* (2012.01)
*G11B 7/131* (2012.01)
(Continued)

(52) U.S. Cl.
CPC ............ *G11B 7/0065* (2013.01); *G11B 7/083* (2013.01); *G11B 7/128* (2013.01); *G11B 7/131* (2013.01); *G11B 7/1353* (2013.01); *G11B 7/1362* (2013.01)

(58) Field of Classification Search
None
See application file for complete search history.

(56) References Cited

U.S. PATENT DOCUMENTS

2009/0296557 A1* 12/2009 Matsuda ............... G11B 19/125
369/103
2010/0157776 A1* 6/2010 Ren .................... G11B 7/00772
369/103
(Continued)

*Primary Examiner* — Peter Vincent Agustin
(74) *Attorney, Agent, or Firm* — Muncy, Geissler, Olds & Lowe, P.C.

(57) ABSTRACT

The present invention relates to a holographic storage device and method for simultaneously recording and reading on two sides, and pertains to the technical field of optical holographic storage. The device and method disclosed in the present invention use a characteristic that orthogonal light would not interfere with each other and a Bragg selectivity characteristic for holographic storage, and use two optical heads to constitute two interference fields orthogonal in polarization directions on two sides of a same position of a holographic storage medium, so as to perform two-path simultaneous recording and reading on a hologram. The device and method provided in the present invention implement two-path parallel recording and reading of holographic storage, and combine shift multiplexing and circumferential rotation multiplexing, thereby improving the speed of an information data recording and reading process while increasing a capacity of the holographic storage.

18 Claims, 2 Drawing Sheets

(51) Int. Cl.
  *G11B 7/1353* (2012.01)
  *G11B 7/1362* (2012.01)

(56) References Cited

U.S. PATENT DOCUMENTS

2010/0172003 A1* 7/2010 Tachibana .............. G11B 7/083
  359/22
2013/0215730 A1* 8/2013 Okamoto ............... G11B 7/128
  369/103

* cited by examiner

HOLOGRAPHIC STORAGE DEVICE AND METHOD FOR SIMULTANEOUSLY RECORDING AND READING ON TWO SIDES

CROSS REFERENCE TO RELATED APPLICATIONS

The present application claims priority from Chinese Patent Application No. 201911422752.6 filed on Dec. 31, 2019, all of which are hereby incorporated herein by reference.

TECHNICAL FIELD

The present invention relates to the technical field of holographic multiplexing storage, and in particular, to a holographic storage device and method for simultaneously recording and reading on two sides which increase a recording and reading speed.

BACKGROUND

Figure 1:
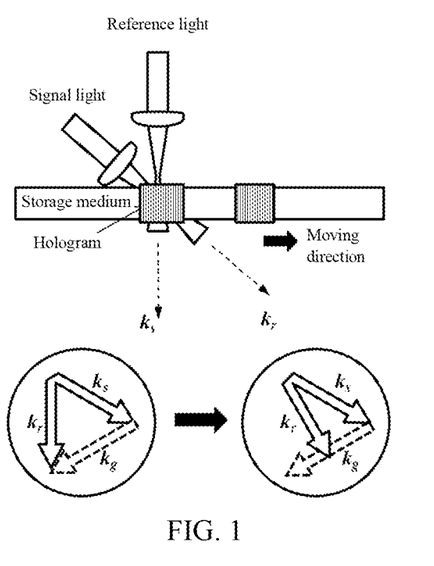
FIG. 1 shows a principle explanation of a shift multiplexing recording method.

FIG. 1 is a schematic diagram of a hologram multiplexing storage technology, which is a method for recording and representing a hologram through shift multiplexing using spherical reference waves. If the medium is moved by a small distance after the hologram is recorded, the hologram cannot be reproduced, i.e., a new hologram can be recorded again. As shown in FIG. 1, according to a Bragg principle, it can be known that a signal beam $k_s$, a reference beam $k_r$, and a grating vector $k_g$ jointly constitute a triangle; if the medium is moved, the original triangle is destroyed, and the hologram cannot likewise be reproduced. In the shift multiplexing recording method, the hologram can be overwritten and recorded at an interval of 3-5 μm in an x-axis direction (a magnetic track direction), but in a y-axis direction (a vertical magnetic track direction), offset by about 250-600 μm—is required; this shift amount is referred to as a shift selectivity. Continuous shift multiplexing in the x-axis direction and the y-axis direction can record the hologram on the entire storage medium, but since the shift selectivity in the y-axis direction is weak, storage multiplexing quantity is still greatly limited, and the storage density is not improved.

Figure 2:
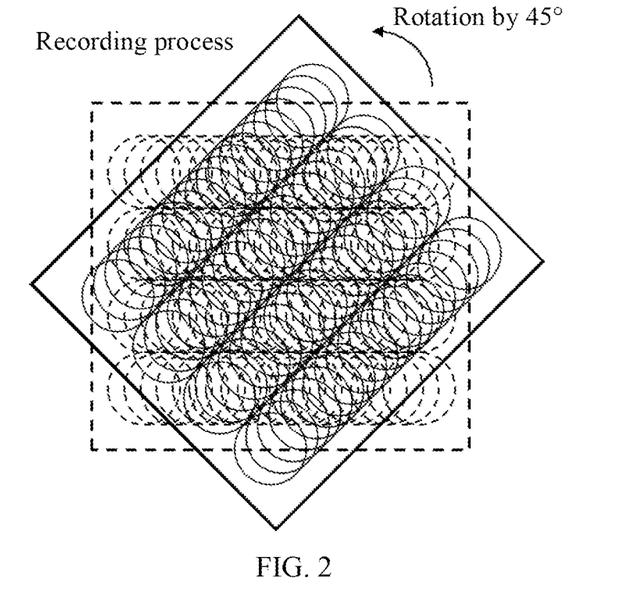
FIG. 2 is a schematic diagram of cross-shift multiplexing.

As shown in FIG. 2, to increase the multiplexing number, based on the two-dimensional recording method, the multiplexing number can further be increased by circumferentially rotating the storage medium and performing overwritten recording, i.e., circumferential rotation multiplexing. First, a two-dimensional hologram array is obtained by means of the shift multiplexing recording, and then immediately, the storage medium is rotated at a predetermined angle, and the angle is a crossing angle. Then, a new two-dimensional hologram array is recorded and is overlapped with a front array; the recording method of combining the shift multiplexing and circumferential rotation multiplexing is referred to as the cross-shift multiplexing recording, and preferably, the crossing angle should be 45° or more.

The system is referred to as a cross-shift multiplexing storage system applying the method of cross-shift multiplexing recording, which can well improve the storage capacity. By applying the method, a storage capacity of a storage medium may reach tens of TBs (the diameter of the storage medium is 120 mm). However, to execute the shift multiplexing storage, the storage medium or the optical head is required to continuously perform stopping and shifting operations, and the recording and reading speeds are limited.

SUMMARY

The present invention aims to overcome at least one disadvantage (deficiency) of the prior art, and provides a holographic storage device and method for simultaneously recording and reading on two sides, where two groups of beams subjected to orthogonal polarization are used for simultaneously recording and reading a hologram from opposite sides of a storage medium, respectively, so that the recording and reading speeds may both be doubled, thereby solving the problem of a low data recording and reading speed existing in the prior art.

According to an aspect, the present invention provides a holographic storage device for simultaneously recording and reading on two sides, where a plurality of optical heads are disposed on both sides of a storage medium, which are capable of performing information recording and reading simultaneously or separately.

Preferably, two optical heads are disposed on both sides of the medium; the two optical heads are capable of performing information recording and reading simultaneously or separately; and the two optical heads are denoted as a first optical head and a second optical head.

Signal beam and reference beam led out from a same optical head in the device are off-axis; signal beams or reference beams are mutually coaxial in the two optical heads during hologram recording; and during hologram recording, polarization of beams between the two optical heads are mutually orthogonal, and polarization of the signal beam and the reference beam in the same optical head are the same.

In the device, when reading the hologram recorded by one optical head, obtained reproduction signal beam is detected by a photoelectric detector in the other optical head.

The device further includes a storage medium moving unit; and shift multiplexing storage is simultaneously performed on both sides of the storage medium by moving the storage medium.

The first optical head and the second optical head are preferably symmetrically disposed.

Specifically, the first optical head includes a first laser output unit, a first reference arm, a first beam expanding and filtering unit, and a first signal arm. The first laser output unit includes a first laser, a first shutter, a first polarizer, a first beam shaper, and a first non-polarizing cube beamsplitter; the first reference arm includes a first reflecting mirror, a first half wave plate, and a first condenser; the first beam expanding and filtering unit includes a first lens, a second lens, and a first low pass filter; and the first signal arm includes a first photoelectric detector, a first polarizing cube beamsplitter, a first spatial light modulator, a first relay lens, a second low pass filter, and a first Fourier lens.

The second optical head includes a second laser output unit, a second reference arm, a second beam expanding and filtering unit, and a second signal arm. The second laser output unit includes a second laser, a second shutter, a second polarizer, a second beam shaper, and a second non-polarizing cube beamsplitter; the second reference arm includes a second reflecting mirror, a second half wave plate, and a second condenser; the second beam expanding and filtering unit includes a first lens, a second lens, and a third low pass filter; and the second signal arm includes a second photoelectric detector, a second polarizing cube beamsplitter, a second spatial light modulator, a second relay lens, a fourth low pass filter, and a second Fourier lens.

A light transmitting direction of the first polarizer is along a horizontal direction; a laser is divided into signal beam A and reference beam B after being incident into the first non-polarizing cube beamsplitter; the first spatial light modulator loads an input signal into the signal beam A and adjusts the polarization direction thereof as a vertical direction; the first half wave plate adjusts the polarization direction of the reference beam B as the vertical direction; the signal beam A and the reference beam B jointly constitute the S recording channel and interfere on the storage medium to form a hologram and record same. A light transmitting direction of the second polarizer is along the vertical direction; a laser is divided into signal beam C and reference beam D after being incident into the second non-polarizing cube beamsplitter; the second spatial light modulator loads an input signal into the signal beam C and adjusts the polarization direction thereof as a horizontal direction; the first half wave plate adjusts the polarization direction of the reference beam D as the horizontal direction; the signal beam C and the reference beam D jointly constitute the P recording channel and interfere at the same position of the other side of the storage medium to form a hologram and record same. The recording position is located on rear focal planes of the first Fourier lens and the second Fourier lens.

Alternatively, the first optical head includes a first laser output unit, a first beam combining unit, a first reference arm, and a first signal transceiving unit; the first laser output unit includes a first laser, a first shutter, a first polarizer, and a first beam shaper; the first beam combining unit includes a third polarizing cube beamsplitter, a third spatial light modulator, a third reflecting mirror, a third relay lens, and a fifth low pass filter; the first reference arm includes a first reflecting mirror and a first condenser; and the first signal transceiving unit includes a fourth polarizing cube beamsplitter, a third half wave plate, a third Fourier lens, a first imaging lens, and a third photoelectric detector.

The second optical head includes a second laser output unit, a second beam combining unit, a second reference arm, and a second signal transceiving unit. The second laser output unit includes a second laser, a second shutter, a second polarizer, and a second beam shaper; the second beam combining unit includes a fifth polarizing cube beamsplitter, a fourth spatial light modulator, a fourth reflecting minor, a fourth relay lens, and a sixth low pass filter; the second reference aim includes a second reflecting mirror, a fourth half wave plate, and a second condenser; and the second signal transceiving unit includes a sixth polarizing cube beamsplitter, a fourth Fourier lens, a second imaging lens, and a fourth photoelectric detector.

The third polarizing cube beamsplitter divides incident light into signal beam A and reference beam B, where the polarization of the reflection reference beam B is vertical, the polarization direction of the transmitting signal beam A is horizontal, and after passing through the third reflecting minor and the third spatial light modulator, the signal beam A returns to the third polarizing cube beamsplitter again and is congregated with the reference beam; the fourth polarizing cube beamsplitter separates the signal beam and the reference beam again, where the transmitting signal beam A adjusts the polarization direction as the vertical direction after passing through the third half wave plate, and constitutes the S recording channel together with the reflection reference beam B, so as to interfere on the storage medium to form a hologram and record same. The fifth polarizing cube beamsplitter divides incident light into signal beam C and reference beam D, where the polarization direction of the reflection reference beam D is vertical, the polarization of the transmitting signal beam C is along a horizontal direction, and after passing through the fourth reflecting mirror and the fourth spatial light modulator, the signal beam returns to the fifth polarizing cube beamsplitter again and is congregated with the reference beam; the sixth polarizing cube beamsplitter separates the signal beam and the reference beam again, where the reflection reference beam D adjusts the polarization direction as the horizontal direction after passing through the fourth half wave plate, and constitutes the P recording channel together with the transmitting signal beam C. Interference occurs at the same position of the other side of the storage medium to form a hologram and record same. The recording position is located on rear focal planes of the third Fourier lens and the fourth Fourier lens.

According to another aspect, the present invention further provides a holographic storage method for simultaneously recording and reading on two sides, where a first optical head and a second optical head symmetrically disposed on two sides of a storage medium perform information recording and reading simultaneously or separately; and information recorded by the first optical head is read by a reading device in the second optical head, and information recorded by the second optical head is read by a reading device in the first optical head.

Specific steps of the method include:

S1: using the first optical head to lead out a signal beam and a reference beam with vertical polarization to constitute an S recording channel; using the second optical head to lead out at a same position a signal beam and a reference beam with horizontal polarization to constitute a P recording channel; and the signal beam and the reference beam led out from the same optical head interfere at a same position of the storage medium to form a hologram so as to record an input signal;

S2: moving the storage medium; performing linear shift multiplexing and circumferential rotation multiplexing on a surface of the storage medium; repeating step S1; and simultaneously performing shift multiplexing storage on entire surfaces of upper and lower sides of the storage medium; and S3: using the reference beam of an original S recording channel to reproduce the recorded hologram at a corresponding position, where diffracted light thereof passes through the storage medium and is read by a reading device in the P channel; and using the reference beam of an original P recording channel to reproduce the recorded hologram at a corresponding position, where diffracted light thereof passes through the storage medium and is read by a reading device in the S channel.

The reference beam in both the device and method of the present invention is a spherical wave.

In the device and method of the present invention, the two signal beams need to be coaxial and the two reference beams need to be coaxial.

The signal beam and reference beam of each optical head in the device and method of the present invention need to be off-axis.

If the optical head in the device and method of the present invention is miniaturized, four or more optical heads can be used to simultaneously record and reproduce, so as to further improve the speed.

The holographic storage device and method for simultaneously recording and reading on both sides provided in the present invention use a characteristic that orthogonal polarization light would not interfere with each other and a Bragg selectivity characteristic for holographic storage, and use two optical heads to constitute two interference fields orthogonal in polarization directions on two sides of a same position of a holographic storage medium, so as to perform two-path simultaneous recording and reading on a hologram. The device and method implement two-path parallel recording or reading of holographic storage combining with shift multiplexing, circumferential rotation multiplexing, and polarization multiplexing, thereby improving the speed of an information data recording and reading process while increasing a capacity of the holographic storage.

BRIEF DESCRIPTION OF DRAWINGS

To describe the technical solutions in the embodiments of the present invention or in the prior art more clearly, the following describes the accompanying drawings required for describing the embodiments or the prior art in detail. Apparently, the accompanying drawings in the following description show some embodiments of the present invention, and a person of ordinary skill in the art may still derive other drawings from these accompanying drawings without creative efforts.

EXPLANATIONS OF REFERENCE NUMERALS

In Embodiment 1, a first optical head 100 includes a first laser output unit 101: a first laser 1011, a first shutter 1012, a first polarizer 1013, a first beam shaper 1014, and a first non-polarizing cube beamsplitter 1015; a first reference arm 102: a first reflecting mirror 1021, a first half wave plate 1022, and a first condenser 1023; a first beam expanding and filtering unit 103: a first lens 1031, a second lens 1032, and a first low pass filter 1033; and a first signal arm 104: a first photoelectric detector 1041, a first polarizing cube beamsplitter 1042, a first spatial light modulator 1043, a first relay lens 1044, a second low pass filter 1045, and a first Fourier lens 1046. A second optical head 200 includes a second laser output unit 201: a second laser 2011, a second shutter 2012, a second polarizer 2013, a second beam shaper 2014, and a second non-polarizing cube beamsplitter 2015; a second reference arm 202: a second reflecting mirror 2021, a second half wave plate 2022, and a second condenser 2023; a second beam expanding and filtering unit 203: a first lens 2031, a second lens 2032, and a third low pass filter 2033; and a second signal arm 204: a second photoelectric detector 2041, a second polarizing cube beamsplitter 2042, a second spatial light modulator 2043, a second relay lens 2044, a fourth low pass filter 2045, and a second Fourier lens 2046.

In Embodiment 2, a first optical head 100 includes a first laser output unit 101: a first laser 1011, a first shutter 1012, a first polarizer 1013, and a first beam shaper 1014; a first beam combining unit 105: a third polarizing cube beamsplitter 1051, a third spatial light modulator 1052, a third reflecting mirror 1053, a third relay lens 1054, and a fifth low pass filter 1055; a first reference arm 102: a first reflecting mirror 1021 and a first condenser 1023; and a first signal transceiving unit 106: a fourth polarizing cube beamsplitter 1061, a third half wave plate 1065, a third Fourier lens 1062, a first imaging lens 1063, and a third photoelectric detector 1064. A second optical head 200 includes a second laser output unit 201: a second laser 2011, a second shutter 2012, a second polarizer 2013, and a second beam shaper 2014; a second beam combining unit 205: a fifth polarizing cube beamsplitter 2051, a fourth spatial light modulator 2052, a fourth reflecting mirror 2053, a fourth relay lens 2054, and a sixth low pass filter 2055; a second reference arm 202: a second reflecting minor 2021, a fourth half wave plate 2022, and a second condenser 2023; and a second signal transceiving unit 206: a sixth polarizing cube beamsplitter 2061, a fourth Fourier lens 2062, a second imaging lens 2063, and a fourth photoelectric detector 2064.

DESCRIPTION OF EMBODIMENTS

The technical solutions in embodiments of the present invention are clearly and completely described below with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

The drawings of the present invention are only for illustrative description and cannot be construed as limiting the present invention. To better illustrate the following embodiments, some components in the drawings may be omitted, enlarged or downscaled, and do not represent the size of the actual product. For a person skilled in the art, it can be understood that some well-known structures and descriptions thereof in the drawings may be omitted.

Embodiment 1

Figure 3:
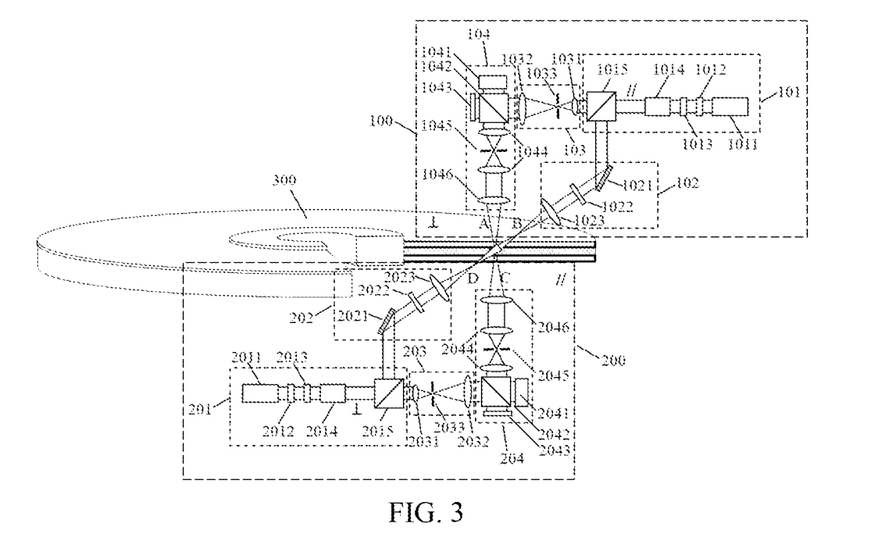
FIG. 3 is a schematic structural diagram of Embodiment 1 of the holographic storage device for simultaneously recording and reading on two sides according to the present invention.

As shown in FIG. 3, the holographic storage device for simultaneously recording and reading on two sides provided in this embodiment includes a first optical head 100, a second optical head 200, and a storage medium 300. The first optical head 100 is configured to generate a signal beam A and a reference beam B with vertical polarization, and includes a first laser output unit 101, a first reference arm 102, a first beam expanding and filtering unit 103, and a first signal arm 104. The second optical head 200 is configured to generate a signal beam C and a reference beam D with horizontal polarization, and includes a second laser output unit 201, a second reference arm 202, a second beam expanding and filtering unit 203, and a second signal arm 204.

The specific implementation process is as follows: The first laser output unit 101 includes a first laser 1011, a first shutter 1012, a first polarizer 1013, a first beam shaper 1014, and a first non-polarizing cube beamsplitter 1015. Specifically, after the beam emitted by the first laser 1011 passes through the first shutter 1012, the first polarizer 1013, and the first beam shaper 1014, the polarization direction of the laser is strictly controlled at the horizontal direction and incident into the first non-polarizing cube beamsplitter 1015 to obtain reflection reference beam and transmitting signal beam, where the reflection reference beam enters the first reference arm 102 and the transmitting light enters the first beam expanding and filtering unit 103. In this embodiment, the first laser 1011 is a semiconductor laser; the first shutter 1012 controls exposure; the first polarizer 1013 adjusts the polarization direction; and the first beam shaper 1014 shapes irregular beams emitted by the semiconductor laser 1011.

The first reference arm 102 includes a first reflecting mirror 1021, a first half wave plate 1022, and a first condenser 1023; after horizontal polarization reflection light passes through the first reflecting minor 1021, the first half wave plate 1022, and the first condenser 1023, a spherical wave reference beam B with a vertical polarization.

The first beam expanding and filtering unit 103 includes a first lens 1031, a second lens 1032, and a first low pass filter 1033; after beam expanding and filtering, the transmitting signal beam subjected to horizontal polarization is incident into a first signal arm 104.

The first signal aim 104 includes a first photoelectric detector 1041, a first polarizing cube beamsplitter 1042, a first spatial light modulator 1043, a first relay lens 1044, a second low pass filter 1045, and a first Fourier lens 1046; after entering the first polarizing cube beamsplitter 1042, the horizontal polarization signal beam is subjected to transmitting only; the first spatial light modulator 1043 reflects the transmitting light after being loaded with an input signal and rotates its polarization direction by 90°, to be changed into vertical polarization signal beam; the vertical polarization signal beam is reflected by the first polarizing cube beamsplitter 1042, passes through the first relay lens 1044, the second low pass filter 1045, and the first Fourier lens 1046, and then forms vertical polarization signal beam A, where an image formed by the first relay lens 1044 for the first spatial light modulator 1043 is located on a front focal plane of the first Fourier lens 1046.

The vertical polarization signal beam A and the spherical wave reference beam B constitute an S recording channel and interfere at the storage medium 300 to form a hologram and record same. The storage medium 300 is located on a rear focal plane of the first Fourier lens 1046.

Similarly, the second laser output unit 201 includes a second laser 2011, a second shutter 2012, a second polarizer 2013, a second beam shaper 2014, and a second non-polarizing cube beamsplitter 2015. Specifically, after the beam emitted by the second laser 2011 passes through the second shutter 2012, the second polarizer 2013, and the second beam shaper 2014, the polarization direction of the laser is strictly controlled at the vertical direction and incident into the second non-polarizing cube beamsplitter 2015 to obtain reflection reference beam and transmitting signal beam, where the reflection reference beam enters the second reference arm 202 and the transmitting light enters the second beam expanding and filtering unit 203.

The second reference arm 202 includes a second reflecting mirror 2021, a second half wave plate 2022, and a second condenser 2023; after vertical polarization reflection light passes through the second reflecting mirror 2021, the second half wave plate 2022, and the second condenser 2023, a spherical wave reference beam D with a polarization direction along the horizontal direction is obtained.

The second beam expanding and filtering unit 203 includes a first lens 2031, a second lens 2032, and a third low pass filter 2033; after beam expanding and filtering, the transmitting signal beam subjected to vertical polarization is incident into a second signal arm 204.

The second signal arm 204 includes a second photoelectric detector 2041, a second polarizing cube beamsplitter 2042, a second spatial light modulator 2043, a second relay lens 2044, a fourth low pass filter 2045, and a second Fourier lens 2046; after entering the second polarizing cube beamsplitter 2042, the vertical polarization signal beam is subjected to reflection only; the second spatial light modulator 2043 loads the reflection light with an input signal, then rotates the polarization direction thereof by 90°, to be changed into horizontal polarization signal beam, and then reflects same again; the horizontal polarization signal beam returns to the second polarizing cube beamsplitter 2042 to be subjected to transmitting only, passes through the second relay lens 2044, the fourth low pass filter 2045, and the second Fourier lens 2046, and then forms horizontal polarization signal beam C. An image formed by the second relay lens 2044 for the second spatial light modulator 2043 is located on a front focal plane of the second Fourier lens 2046.

The horizontal polarization signal beam C and the spherical wave reference beam D constitute a P recording channel and interfere at the storage medium 300 to form a hologram and record same. The storage medium 300 is located on a rear focal plane of the second Fourier lens 2046.

By moving the storage medium, shift multiplexing storage can be simultaneously performed on two sides of the storage medium; by using the characteristic that orthogonal polarization light does not interfere, the storage of the hologram is simultaneously performed on the upper and lower sides of the storage medium.

During reading, the first spatial light modulator 1043 has no input signal, the beam reflected by the first spatial light modulator 1043 is still in the horizontal polarization direction, and cannot be reflected by the first polarizing cube beamsplitter to enter the signal beam channel, the signal beam is zero, and only the reference beam B polarized along the vertical direction exists; after the reference beam B is incident into the storage medium 300, diffraction occurs; the diffraction light would carry the signal to enter the second signal arm 204 along an original direction of the signal beam A, and after being subjected to inverse Fourier transform by the second Fourier lens 2046, imaging by the second relay lens 2044, and filtering by the fourth low pass filter 2045, the diffraction light is incident into the second polarizing cube beamsplitter 2042; only the reflection light exists at this time, and the reflection light is received by the second photoelectric detector 2041. Similarly, the second spatial light modulator 2043 has no input signal, the beam reflected by the second spatial light modulator 2043 is still in the vertical polarization direction, and cannot be transmitted by the first polarizing cube beamsplitter to enter the signal beam channel, the signal beam is zero, and only the reference beam D polarized along the horizontal direction exists; after the reference beam D is incident into the storage medium 300, diffraction occurs; the diffraction light would carry the signal to enter the first signal arm 104 along an original direction of the signal beam C, and after being subjected to inverse Fourier transform by the first Fourier lens 1046, imaging by the first relay lens 1044, and filtering by the second low pass filter 1045, the diffraction light is incident into the first polarizing cube beamsplitter 1042; only the transmitting light exists at this time, and the transmitting light is received by the first photoelectric detector 1041.

Embodiment 2

Figure 4:
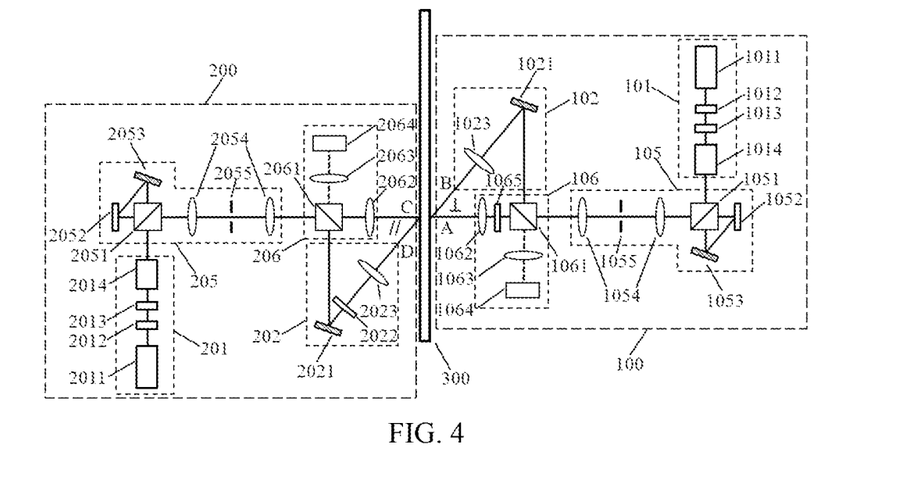
FIG. 4 is a schematic structural diagram of Embodiment 2 of the holographic storage system for simultaneously recording and reading on two sides according to the present invention.

As shown in FIG. 4, the holographic storage device for simultaneously recording and reading on two sides provided in this embodiment includes a first optical head 100, a second optical head 200, and a storage medium 300. The first optical head 100 is configured to generate a signal beam A and a reference beam B with vertical polarization, and specifically includes a first laser output unit 101, a first beam combining unit 105, a first reference arm 102, and a first signal transceiving unit 106. The second optical head 200 is configured to generate a signal beam C and a reference beam D with polarization directions along a horizontal direction, and specifically includes a second laser output unit 101, a second beam combining unit 105, a second reference arm 102, and a second signal transceiving unit 106.

The specific implementation process is as follows: The first laser output unit 101 includes a first laser 1011, a first shutter 1012, a first polarizer 1013, and a first beam shaper 1014. Specifically, after the beam emitted by the first laser 1011 passes through the first shutter 1012, the first polarizer 1013, and the first beam shaper 1014, the polarization of the laser is at an angle of 45° from the horizontal and the beam is incident into the first beam combining unit 105.

The first beam combining unit 105 includes a third polarizing cube beamsplitter 1051, a third spatial light modulator 1052, a third reflecting minor 1053, a third relay lens 1054, and a fifth low pass filter 1055, and can convert the input light into the coaxial signal beam and reference beam, and output both to the first signal transceiving unit 106 after beam expanding. Specifically, the third polarizing cube beamsplitter 1051 decomposes the input light into reflection reference beam with a vertical polarization direction and transmitting light with a horizontal polarization direction, where the transmitting light is reflected by the third reflecting mirror 1053 and then irradiates on the third spatial light modulator 1052; the third spatial light modulator 1052 loads the light with an input signal and then reflects same; the reflection signal beam returns to the third polarizing cube beamsplitter 1051, then converges with the reflection reference beam; the final converged light is output to the first signal transceiving unit 106 after imaging by the third relay lens 1054 and filtering by the fifth low pass filter 1055.

The first signal transceiving unit 106 includes a fourth polarizing cube beamsplitter 1061, a third half wave plate 1065, a third Fourier lens 1062, a first imaging lens 1063, and a third photoelectric detector 1064. The first signal transceiving unit 106 separate the received signal beam from reference beam and simultaneously receive reproduction signal beam of the second optical head 200 when reading the signal. Specifically, a vertical polarization reference beam component in the input light is reflected and output to the first reference arm 102 by the fourth polarizing cube beamsplitter 1061; a horizontal polarization signal beam component in the input light is transmitted with the polarization being adjusted to the vertical direction by the third half wave plate 1065, and form the signal beam A with the vertical polarization direction by the third Fourier lens 1062.

The first reference arm 102 includes the first reflecting mirror 1021 and the first condenser 1023; after vertical polarization reflection light passes through the first reflecting minor 1021 and the first condenser 1023, a spherical wave reference beam B with a polarization direction along the vertical direction is obtained.

The vertical polarization signal beam A and the spherical wave reference beam B constitute an S recording channel, and interfere at the storage medium 300 to form a hologram and record same. The storage medium 300 is located on a rear focal plane of the third Fourier lens 1062.

Similarly, the second laser output unit 201 includes a second laser 2011, a second shutter 2012, a second polarizer 2013, and a second beam shaper 2014. Specifically, after the beam emitted by the second laser 2011 passes through the second shutter 2012, the second polarizer 2013, and the second beam shaper 2014, the polarization direction of the laser and the horizontal direction form an angle of 45° and the beam is incident into the second beam combining unit 205.

The second beam combining unit 205 includes a fifth polarizing cube beamsplitter 2051, a fourth spatial light modulator 2052, a fourth reflecting mirror 2053, a fourth relay lens 2054, and a sixth low pass filter 2055, and can convert the input light into the coaxial signal beam and reference beam, perform beam expanding on both and output same to the second signal transceiving unit 206. Specifically, the fifth polarizing cube beamsplitter 2051 decomposes the input light into reflection reference beam with a vertical polarization direction and transmitting light with a horizontal polarization direction, where the transmitting light is reflected by the fourth reflecting mirror 2053 and then irradiates on the fourth spatial light modulator 2052; the fourth spatial light modulator 2052 loads the light with an input signal and then reflects same; the reflection signal beam returns to the fifth polarizing cube beamsplitter 2051, then transmits, and converges with the reflection reference beam; the final converged light is output to the second signal transceiving unit 206 after imaging by the fourth relay lens 2054 and filtering by the sixth low pass filter 2055.

The second signal transceiving unit 206 includes a sixth polarizing cube beamsplitter 2061, a fourth Fourier lens 2062, a second imaging lens 2063, and a fourth photoelectric detector 2064, and is configured to separate the received signal beam and reference beam and simultaneously receive reproduction signal beam of the first optical head 100 when reading the signal. Specifically, a vertical polarization reference beam component in the input light is reflected and output to the second reference aim 202 by the sixth polarizing cube beamsplitter 2061; a horizontal polarization signal beam component in the input light transmits and is converged to form the signal beam C with the horizontal polarization direction by the fourth Fourier lens 2062.

The second reference arm 202 includes a second reflecting mirror 2021, a fourth half wave plate 2022, and a second condenser 2023; after vertical polarization reflection light passes through the second reflecting mirror 2021 and the fourth half wave plate 2022 and the polarization direction thereof is adjusted as the horizontal direction, the reflection light is converged by the second condenser 2023 to obtain a spherical wave reference beam D with a polarization direction along the horizontal direction.

The horizontal polarization signal beam C and the spherical wave reference beam D constitute a P recording channel and interfere at the storage medium 300 to form a hologram and record same. The storage medium 300 is located on a rear focal plane of the third Fourier lens 2062.

By moving the storage medium, shift multiplexing storage can be simultaneously performed on two sides of the storage medium; by using the characteristic that orthogonal polarization light does not interfere, the storage of the hologram is simultaneously performed on the upper and lower sides of the storage medium.

During reading, the third spatial light modulator 1052 has no input signal, the first beam combing unit 105 outputs only the reference beam B with the vertical polarization direction; after the reference beam B is incident into the storage medium 300, diffraction occurs; the diffraction light would carry the signal to enter the second optical head 200 along an original direction of the signal beam A, and after being subjected to inverse Fourier transform by the fourth Fourier lens 2062, reflection by the sixth polarizing cube beamsplitter 2061, and imaging by the second imaging lens 2063, the signal is read by the fourth photoelectric detector 2064. Similarly, the fourth spatial light modulator 2052 has no input signal, the second beam combing unit 205 outputs only the reference beam D with the horizontal polarization direction; after the reference beam D is incident into the storage medium 300, diffraction occurs; the diffraction light would carry the signal to enter the first optical head 100 along an original direction of the signal beam C, and after being subjected to inverse Fourier transform by the third Fourier lens 1062, adjustment of the polarization direction as the vertical direction by the third half wave plate 1065, reflection by the fourth polarizing cube beamsplitter 2061, and imaging by the first imaging lens 1063, the signal is read by the third photoelectric detector 1064.

Embodiment 3

This embodiment provides a holographic storage method for simultaneously recording and reading on two sides, where a first optical head and a second optical head symmetrically disposed on two sides of a storage medium perform information recording and reading simultaneously or separately; and information recorded by the first optical head is read by a reading device in the second optical head, and information recorded by the second optical head is read by a reading device in the first optical head.

Specific steps of the method include:

S1: using the first optical head to lead out a signal beam and a reference beam with polarization directions along a vertical direction to constitute an S recording channel; using the second optical head to lead out at a same position a signal beam and a reference beam with polarization directions along a horizontal direction to constitute a P recording channel; and the signal beam and the reference beam led out from the same optical head interfere at a same position of a storage medium to form a hologram so as to record an input signal;

S2: moving the storage medium; performing linear shift multiplexing and circumferential rotation multiplexing on a surface of the storage medium; repeating step S1; and simultaneously performing shift multiplexing storage on entire surfaces of upper and lower sides of the storage medium; and S3: using the reference beam of an original S recording channel to reproduce the recorded hologram at a corresponding position, where diffracted light thereof passes through the storage medium and is read by a reading device in the P channel; and using the reference beam of an original P recording channel to reproduce the recorded hologram at a corresponding position, where diffracted light thereof passes through the storage medium and is read by a reading device in the S channel.

In the above embodiments, the first laser 1011 and the second laser 2012 are semiconductor lasers with a wavelength of 405 mn: the first spatial light modulator 1043 and the second spatial light modulator 2043 are reflecting liquid crystal spatial light modulators; the third spatial light modulator 1052 and the fourth spatial light modulator 2052 are digital micromirror devices.

Apparently, the above-mentioned embodiments of the present invention are merely examples to clearly illustrate the technical solutions of the present invention, and are not intended to limit the specific embodiments of the present invention. Any modifications, equivalent replacements, and improvements, etc. made within the spirit and principle of the claims of the present invention shall fall within the protection scope of the claims of the present invention.

What is claimed is:

1. A holographic storage device for simultaneously recording and reading on two sides, wherein two optical heads are disposed on both sides of a medium; the two optical heads are capable of performing information recording and reading simultaneously or separately, and
wherein during hologram recording, polarization directions of beams between the two optical heads are mutually orthogonal, and polarization directions of a signal beam and a reference beam in a same optical head are the same.

2. The holographic storage device for simultaneously recording and reading on two sides according to claim 1, wherein the signal beam and the reference beam led out from a same optical head are off-axis.

3. The holographic storage device for simultaneously recording and reading on two sides according to claim 1, wherein the signal beam or the reference beam is mutually coaxial in the two optical heads during the hologram recording.

4. The holographic storage device for simultaneously recording and reading on two sides according to claim 1, wherein shift multiplexing storage is simultaneously performed on both sides of a storage medium by moving the storage medium.

5. The holographic storage device for simultaneously recording and reading on two sides according to claim 1, wherein when reading a hologram recorded by one optical head, obtained reproduction signal beam is detected by a photoelectric detector in the other optical head.

6. A holographic storage device for simultaneously recording and reading on two sides, comprising a plurality of optical heads disposed on both sides of a storage medium, which are capable of performing information recording and reading simultaneously or separately, the plurality of optical heads includes, a first optical head and a second optical head, which are symmetrically disposed on two sides of the storage medium respectively; the first optical head and the second optical head are capable of performing information recording and reading simultaneously or separately; and information recorded by the first optical head is read by a reading device in the second optical head, and information recorded by the second optical head is read by a reading device in the first optical head, each reading device has a photoelectric detector configured to detect an obtained reproduction signal beam.

7. The holographic storage device for simultaneously recording and reading on two sides according to claim 6, wherein the first optical head comprises a first laser output unit, a first reference arm, a first beam expanding and filtering unit, and a first signal arm; and the second optical head comprises a second laser output unit, a second reference arm, a second beam expanding and filtering unit, and a second signal arm.

8. The holographic storage device for simultaneously recording and reading on two sides according to claim 7, wherein the first laser output unit comprises a first laser, a first shutter, a first polarizer, a first beam shaper, and a first non-polarizing cube beamsplitter; and the second laser output unit comprises a second laser, a second shutter, a second polarizer, a second beam shaper, and a second non-polarizing cube beamsplitter.

9. The holographic storage device for simultaneously recording and reading on two sides according to claim 7, wherein the first reference arm comprises a first reflecting mirror, a first half wave plate, and a first condenser; and the second reference arm comprises a second reflecting mirror, a second half wave plate, and a second condenser.

10. The holographic storage device for simultaneously recording and reading on two sides according to claim 7, wherein the first beam expanding and filtering unit and the second beam expanding and filtering unit respectively comprise two lenses and a low pass filter.

11. The holographic storage device for simultaneously recording and reading on two sides according to claim 7, wherein the first signal arm comprises a first photoelectric detector, a first polarizing cube beamsplitter, a first spatial light modulator, a first relay lens, a second low pass filter, and a first Fourier lens; and the second signal arm comprises a second photoelectric detector, a second polarizing cube beamsplitter, a second spatial light modulator, a second relay lens, a fourth low pass filter, and a second Fourier lens.

12. The holographic storage device for simultaneously recording and reading on two sides according to claim 6, wherein the first optical head comprises a first laser output unit, a first beam combining unit, a first reference arm, and a first signal transceiving unit; and the second optical head comprises a second laser output unit, a second beam combining unit, a second reference arm, and a second signal transceiving unit.

13. The holographic storage device for simultaneously recording and reading on two sides according to claim 12, wherein the first laser output unit comprises a first laser, a first shutter, a first polarizer, and a first beam shaper; and the second laser output unit comprises a second laser, a second shutter, a second polarizer, and a second beam shaper.

14. The holographic storage device for simultaneously recording and reading on two sides according to claim 12, wherein the first beam combining unit comprises a third polarizing cube beamsplitter, a third spatial light modulator, a third reflecting mirror, a third relay lens, and a fifth low pass filter; and the second beam combining unit comprises a fifth polarizing cube beamsplitter, a fourth spatial light modulator, a fourth reflecting mirror, a fourth relay lens, and a sixth low pass filter.

15. The holographic storage device for simultaneously recording and reading on two sides according to claim 12, wherein the first reference arm comprises a first reflecting mirror and a first condenser; and the second reference arm comprises a second reflecting mirror, a fourth half wave plate, and a second condenser.

16. The holographic storage device for simultaneously recording and reading on two sides according to claim 12, wherein the first signal transceiving unit comprises a fourth polarizing cube beamsplitter, a third half wave plate, a third Fourier lens, a first imaging lens, and a third photoelectric detector; and the second signal transceiving unit comprises a sixth polarizing cube beamsplitter, a fourth Fourier lens, a second imaging lens, and a fourth photoelectric detector.

17. A holographic storage method for simultaneously recording and reading on two sides, wherein a first optical head and a second optical head symmetrically disposed on two sides of a storage medium perform information recording and reading simultaneously or separately, comprising:
  reading information recorded by the first optical head by a reading device in the second optical head, and reading information recorded by the second optical head by a reading device in the first optical head.

18. The holographic storage method for simultaneously recording and reading on two sides according to claim 17, further comprising the following steps:
  S1: using the first optical head to lead out a signal beam and a reference beam with vertical polarization or horizontal polarization to constitute an S recording channel; using the second optical head to lead out a signal beam and a reference beam at the same position with polarization opposite to those of the S recording channel to constitute a P recording channel; and the signal beam and the reference beam led out from the same optical head interfere at a same position of the storage medium to form a hologram so as to record an input signal;
  S2: moving the storage medium; performing linear shift multiplexing and circumferential rotation multiplexing on a surface of the storage medium; repeating step S1; and simultaneously performing shift multiplexing storage on entire surfaces of upper and lower sides of the storage medium; and
  S3: using the reference beam of an original S recording channel to reproduce the recorded hologram at a corresponding position, wherein diffracted light thereof passes through the storage medium and is read by a reading device in the P channel; and using the reference beam of an original P recording channel to reproduce the recorded hologram at a corresponding position, wherein diffracted light thereof passes through the storage medium and is read by a reading device in the S channel.

* * * * *